April 7, 1953 M. BRUCKER 2,633,605
PROCESS FOR MAKING MOLDED RESINOUS PRODUCTS
Filed Dec. 17, 1949 2 SHEETS—SHEET 1
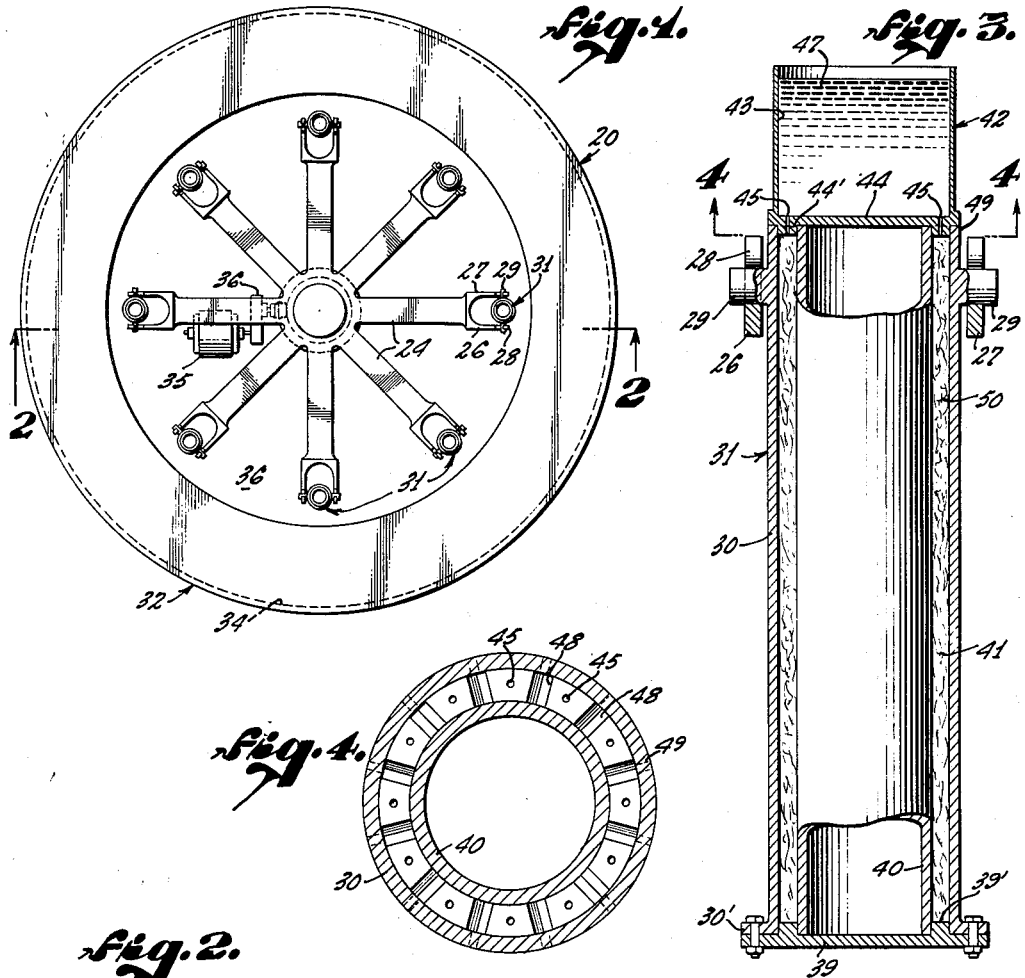
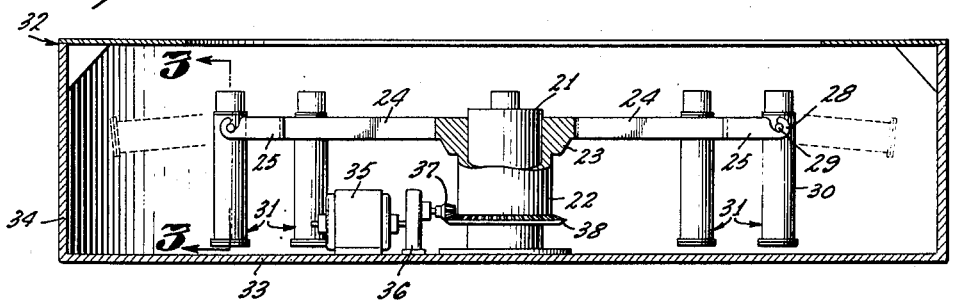
MILTON BRUCKER,
INVENTOR.
HUEBNER, BEEHLER, WORREL,
HERZIG & CALDWELL,
ATTORNEYS.
BY
Albert M Herzig April 7, 1953 M. BRUCKER 2,633,605
PROCESS FOR MAKING MOLDED RESINOUS PRODUCTS
Filed Dec. 17, 1949 2 SHEETS—SHEET 2
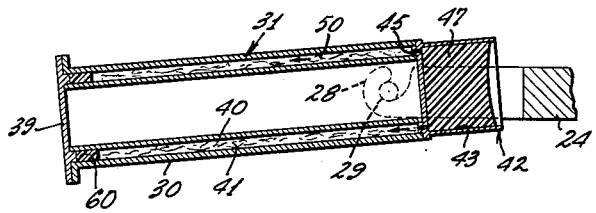
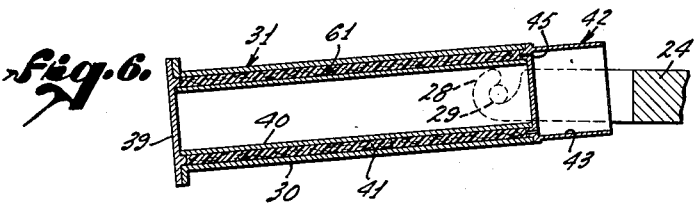
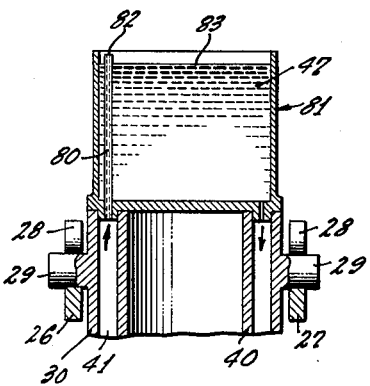
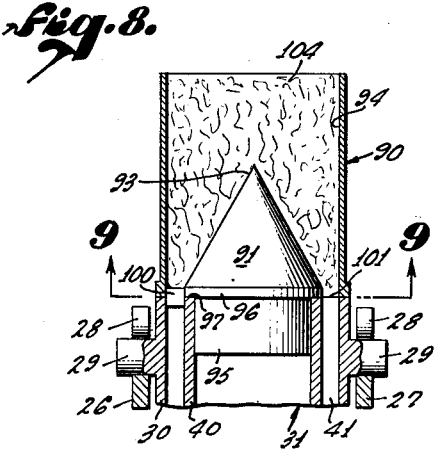
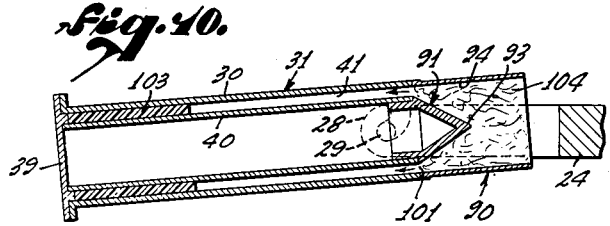
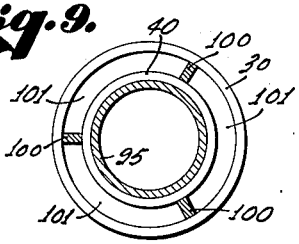
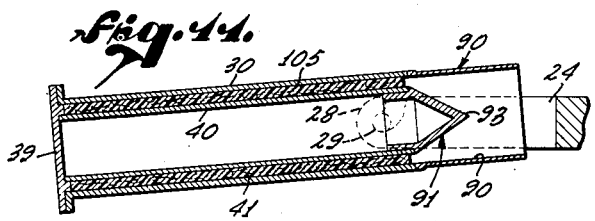
MILTON BRUCKER,
INVENTOR.
HUEBNER, BEEHLER, WORREL,
HERZIG & CALDWELL,
ATTORNEYS.
BY Albert M Herzig Patented Apr. 7, 1953

2,633,605

UNITED STATES PATENT OFFICE 2,633,605

PROCESS FOR MAKING MOLDED RESINOUS PRODUCTS

Milton Brucker, Los Angeles, Calif., assignor to Zenith Plastics Co., Gardena, Calif., a corporation of California Application December 17, 1949, Serial No. 133,535

6 Claims. (Cl. 18—58.3)

This invention relates to a process for making a fiberglass-reenforced resin. More particularly the invention relates to a method for impregnating a plastic resin with fiberglass or the like reenforcement, or, optionally contrariness, introducing the resin into the fiberglass mass or preform.

Resin laminates are generally made with paper, cotton fabric, asbestos fabrics, glassfiber and similar reenforcements. The choice of reenforcement is affected by the laminating method employed. Glass mats are employed for high pressure and increasing for low pressure laminates with or without preforming, weaving of the fibers or otherwise pre-aligning them.

Previous methods of laminating include the "blanket" type method employing female molds with a vacuum line drawing directly from the mold cavity and in which a rubber blanket or the like is drawn against a tailored filler section. Pressures are generated by this method sufficient for polymerization of some resins but for the application of additional pressure an airtight metal lid must be secured over the blanket for applying additional air or steam pressure. The vacuum bag method is subject to similar limitations.

The common mating molds do not assure uniform pressure of all surface points and frequently produce inferior products. Other techniques currently employed include continuous laminating or laminating by catalysis.

The above methods fall short of applicant's in the results of uniform perfection and economy.

This invention has among its objects the provision of new and improved process for forming mat reenforced resins of relatively heavy viscosity and for achieving a stronger molded part of improved chemical and water heat resistant properties.

It is also among the objects of this invention to increase the speed of impregnation of the mat with the resin or vice versa.

The invention also includes among its objects the provision of new and improved centrifuge operations to accomplish the desired results.

Yet other objects of the invention are the provision of improved alternative methods of feeding either the resin to the fiber or the fiber to the resin as desired.

Another object of the invention is the provision of new and improved methods for exerting a molding and laminating pressure to achieve simultaneous molding and laminating.

It is moreover, among the objects of the invention, to provide methods over prior art methods heretofore intended to accomplish generally similar purposes.

Further objects and advantages of this invention will become apparent on reference to the following description and claims and attached drawings, wherein:

Figure 1 is a plan view of a centrifugal machine embodying this invention;

Figure 2 is a vertical sectional view taken as on a line 2—2 of Figure 1;

Figure 3 is a vertical sectional view, enlarged, taken as on a line 3—3 of Figure 2;

Figure 4 is a sectional view as on a line 4—4 of Figure 3;

Figure 5 is a reduced version generally similar to Figure 3 but showing the mold in a position of operation in the machine;

Figure 6 is a view similar to Figure 5 showing the molding feed process in a stage of actual or substantial completion;

Figure 7 is a fragmentary vertical section view of a modified form of mold embodying this invention;

Figure 8 is a view similar to Figure 7 of a further modified form of mold embodying the invention;

Figure 9 is a sectional view on a line 9—9 of Figure 8;

Figure 10 is a sectional view of said further modified mold in an initial phase of use;

Figure 11 is a view similar to Figure 10 but showing the molding process actuatlly or substantially completed.

Referring more particularly to the drawings, there is illustrated by way of example a centrifugal machine generally designated at 20 comprising a vertical post 21 rotatably supporting a collar 22 to which is secured a hub 23 having radially extending arms 24.

At the outer end of each arm 24 is a yoke or the like 25 comprising opposed members 26, 27, each of which is preferably formed with a hook 28 adapted to receive radially extending pins 29 projecting from the outer shell 30 of each individual mold generally designated at 31.

The machine 20 preferably includes an outer casing and protective frame 32 which may include a bottom 33 and sides 34 preferably comprising a cylindrical wall.

Any motor 35, as through a gear box 36, and a gear 37, rotates a ring gear 38 secured to the hub 23 for rotation thereof and of the arms 24. The motor 35 as illustrated is of the electrical type and preferably has a controllable speed through any well-known means. Obviously, any other motor force or drive connection for rotation of the apparatus may be employed.

The molds 31 are of a shape conforming to the object to be molded so that it will be apparent that the particular illustrated form embodies only one of an infinite number of shapes which may then incorporate obvious structural modifications to insure their analogous functioning in the manner contemplated.

Each mold 31 may be adapted for similar or different shaped products, but those illustrated each comprise the outer shell 30 of tubular form having flanges 30' for mounting thereon a bottom plate 39 preferably formed with an annular flange 39' adapted to accommodate the lower end of an inner shell 40 preferably likewise of tubular shape but spaced inwardly from the outer shell 30 to define an annular concavity 41, comprising the desired shape of a molded product.

At the top of the mold is a cap 42 defining a reservoir 43, the bottom 44 of which includes an annular flange 44" comprising a spacer for the inner and outer shells 40 and 30 respectively.

Inlet ports 45, preferably parallel to the axis of the mold, communicate between the reservoir 43 and the mold concavity 41 in order that molten resin 47 may pass from the reservoir into the concavity under centrifugal force as will be noted.

The annular flange 44" is preferably formed with radially extending grooves 48, or other passageways, designed to communicate radially outwardly as well as downwardly into the concavity 41 in order that resin or other material from the reservoir 43 into the concavity 41 will be assured of an escape vent for air, or other gases, otherwise entrapped in the concavity 40, or within the body of the resinous material filling the same. For such purpose and to communicate outwardly with the grooves 48 the top of the outer shell, as at 49, or adjacent structure, can be undercut or provided with passageways or grooves communicating with and preferably matching such grooves or other passageways 48. Any desired means of assuring registry of the grooves 48 with passages formed at 49 may be employed, e. g., by including a wide circumferential opening at the top 49 or by interfitting tongues and grooves formed respectively in the top 42 and the upper end of the inner or outer shells 40 and 30.

In the operation of the instant apparatus, the molds 31, by means of their pins 29, are hooked and hung into place on the members 26 and 27.

Prior to such hooking, or subsequent thereto and prior to the positioning thereon of the top 42, any desired fibrous or other reenforcing or laminating material is positioned within the concavity 41. Preferably such material may be a fiber glass mat usually of preformed tubular appearance which may be slipped axially into the concavity 41 over the inner shell 40 and within the outer shell 30.

The inner shell 40 preferably has a slip fit within the annular flange 39' and the annular flange 44' so that it may be removed prior to the insertion of the upper glass mat designated at 50, or such mat 50 may be formed or slipped over the inner shell 40 prior to its insertion within the outer shell 30. In any event, the mat 50 having been properly replaced, the top 42 is set in position over the mold.

The reservoir 43 is then filled with any desired resinous material. The entire assembly is then rotated with greater or less rapidity depending upon the amount of centrifugal force necessary to create the desired pressure within the mold. The extent of such centrifugal force and the time for rotation, as well as the temperature under which the resinous material is injected or molded, will obviously differ depending upon the material used, and the desired characteristics of the final products, and can be readily calculated.

By way of example, and to illustrate its use in the instant process, a product of the above described cylindrical shape having a wall thickness of approximately ½", a 12" diameter and 4½' long was first made by the conventional injection molding process by the vacuum method and by the combination of vacuum and injection methods. In the injection method, 45 to 90 minutes was required to impregnate the fibers of the fiber glass mat with resin following the addition of a diluent such as styrene in the amount of approximately 10 to 15% by volume. A like period was required for impregnation by the vacuum method, while the combination method of injection and vacuum required approximately 30 minutes to an hour. The reduction in ultimate strength by the addition of the styrene was approximately 10%, and such diluent remained as an undesirable residue in the final product. The resin used was 5003 Selectron, a commercially available polyester. The fiber glass mat as used comprised approximately 30% by weight of the ultimate product. Such resultant product was in several instances necessarily rejected for molding flaws.

By contrast, the instant process required only 5 to 15 minutes for complete impregnation of the fiber with resin. No styrene or other diluent was required. The heavier viscosity of the resin permitted a stronger resultant part with better chemical, water and heat resistant properties than the product of the above mentioned conventional processes.

When the centrifugal force applied equaled approximately four times the pull of gravity, the impregnation time was approximately 15 minutes. When the centrifugal load was stepped up to 15 times gravity, the impregnation time was reduced to approximately 7 minutes. At 50 times gravity, impregnation required only approximately 4 minutes.

It may be noted that in all cases the migration of resin into the fiber glass or vice versa was accelerated after the wetting of the fiber glass with the resin, but any attempt to use a wet fiber containing any foreign substance such as water results, in the conventional processes heretofore employed, in the formation of bubbles within the product. By the instant process, even a wet fibrous mat may be used without preliminary drying provided the resin has a greater specific gravity than the foreign wetting agents and the gases, if any, formed thereby.

In the above example, conventional processes required the use of a resin having a maximum viscosity of not more than 50 centipoises. With the use of the instant apparatus and invention, a viscosity of not less than 500 centipoises was maintained.

As illustrated in Figures 5 and 6, when the molds 31 are whirled about on the centrifugal machine 20, the resins 47 first piles up as at 60 after passing through the concavity 41 through the holes 45 leading from the reservoir 43. Inasmuch as the entire apparatus is under centrifugal pressure, the resin 47 does not spill from the reservoir 42 even though the mold is tilted outwardly substantially to a horizontal position as illustrated in dotted outline in Figure 2 and as further illustrated in Figures 5 and 6.

The fibers 50 when pressed into a preformed shape substantially occupy the concavity 41 and have been found to retain their position within such concavity notwithstanding the application of sufficient centrifugal force to drive the resin from the reservoir 43 through said inlets 45 and said concavity 41 towards the bottom thereof until the same is filled. Accordingly, Figure 5 illustrates an initial phase of centrifuging, and Figure 6, a final phase, wherein all of the resin 47 has entered the concavity 41 filling the same, and firmly and completely impregnating and surrounding the fibers 50 disposed therein to the entire exclusion of undesired bubbles and the avoidance of other molding inequalities in the finished product.

Following centrifuging the inner shell 40 may be removed and, after removal of the cap 42 or the bottom plate 39, the finished resin-impregnated fiberglass-reenforced product 61 may be withdrawn prior or subsequent to heat curing in or out of the mold as required.

Modified form

A modified form of cap construction is illustrated in Figure 7 wherein corresponding parts of the previous embodiment are designated by like reference numerals. In the modified form tubes such as 80 communicate between the concavity 41 when the cap 81 is in place and have an end 82 projecting upwardly beyond the surface 83 of the resin 47 whereby air is forced out of the concavity by the resin 47 entrant through the holes 45, said flow being indicated by arrows.

In the embodiment of Figure 7 the radially extending grooves or other passageways 48 of the preceding embodiment of Figures 1 through 6 may be omitted.

Further modified form

A further modification of the invention is is illustrated in Figures 8 through 11 wherein other parts of the mold 31 than the cap 90 may correspond to the structure of the preceding embodiments and are accordingly designated by like reference numerals.

In said further modified form, a tapered plug or bottom hood 91 may comprise an integral or separate part from the remainder of the cap 90. The conical end 93 of the plug projects upwardly into the reservoir 94 and is normally preferably slidably retained within the inner shell 40 as by a cylindrical end 95.

An annular shoulder 96 rests upon the upper edge 97 of the inner shell and, if separable, may have a sliding engagement with the inner shell designed to center the inner shell and plug 91 as well as to space the inner and outer shells as heretofore noted. For the latter purpose the bottom of the cap preferably includes a spider comprising widely spaced radial lugs 100. The openings 101 between the lugs 100 permit free communication between the reservoir 94 and the concavity 41.

In the operation of the further modified embodiment of Figures 8 through 11, the concavity 41 is filled to a predetermined extent with resin 103 in the bottom thereof and the reservoir 94 is filled with fibrous material, such as fiberglass 104. Upon centrifuging the molds 31, the fiberglass or other such laminating material migrates into the concavity forcing the resinous material toward the center of the centrifugal machine and causing a highly satisfactory resultant product 105 filling the concavity and having a surprisingly uniform distribution therein of the fiberglass material and the resin.

The machine can be balanced against excessive vibration in any known manner or can be balanced by the similarity and symmetry of the molds and their circumferential spacing.

This invention features a new and improved method of great effectiveness for economical production of substantially flawless resinous parts, preferably including a laminate. As such, it provides essentially a new and improved method for impregnating and/or molding a resin with or without a laminate.

The invention having been herein described, what I claim as new and desire to secure by Letters Patent is:

1. A method of molding a resinous product utilizing a liquid moldable resinous constituent and a moldable fibrous constituent to form an article of substantially uniform texture reinforced by said fibrous constituent which is interspersed therethrough, comprising the steps of: placing a first of said constituents in a mold cavity in a quantity substantially equal to the quantity of said constituent present in the formed product and in a quantity insufficient to solidly fill said mold cavity whereby said mold cavity retains a gaseous content, placing a second of said constituents outside the mold cavity and over a restricted inlet thereto in a quantity sufficient to cause said mold cavity to be solidly filled when said constituents are intermixed, simultaneously subjecting the first constituent containing mold cavity and the second constituent to centrifugal action to drive said second constituent into the mold cavity to simultaneously intermix the same throughout said first constituent, expelling from said mold cavity the gaseous content of said cavity along with any impurities of lesser specific gravity than said constituents which might be present in said mold cavity, and continuing centrifugal action until said second constituent has dispersed itself in the mold cavity in uniform intermixture with said first constituent.

2. A method of molding a resinous product within a mold comprising the steps of: forming and inserting a reticulate fibrous mat into said mold substantially filling the same, injecting a molten resin into the cavity of said mold by simultaneously centrifuging said mat containing mold and said molten resin, and simultaneously removing from said mold any gaseous and fluid constituents and impurities of lesser specific gravity than said resin and said fibrous material.

3. A method of molding a resinous product according to claim 2 including the step of curing the molded resin during such centrifuging.

4. A method of molding a resinous product according to claim 2 including the step of removing said molded resin from the mold and curing the molded resin so removed.

5. The molding method of claim 2, including the step of loosely preforming, pressing and packing said mat so that such preformed mat occupies the entire mold cavity with only sufficient tightness to cause the same to remain substantially fixed within the cavity during the centrifuging operation.

6. A method of molding a resinous product within a mold comprising the steps of: placing a molten resin in the cavity of said mold and inserting discrete separate quantities of a fibrous material by simultaneously centrifuging said resin containing mold and said discrete separate quantities of said fibrous material.

MILTON BRUCKER.

REFERENCES CITED

The following references are of record in the file of this patent:

UNITED STATES PATENTS

| Number | Name | Date |
|---|---|---|
| 656,192 | Howard | Aug. 21, 1900 |
| 1,318,520 | Wolever | Oct. 14, 1919 |
| 1,341,670 | Powell | June 1, 1920 |
| 1,541,831 | Linder | June 16, 1925 |
| 1,668,763 | Dickson | May 8, 1928 |
| 2,433,065 | Rubissow | Dec. 23, 1947 |